(12) United States Patent  
Zhao (10) Patent No.: US 8,676,993 B1  
(45) Date of Patent: Mar. 18, 2014

(54) BUNDLED TRANSMISSION CONTROL PROTOCOL CONNECTIONS

(75) Inventor: Fan Zhao, Campbell, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 13/165,444

(22) Filed: Jun. 21, 2011

(51) Int. Cl.
*G06F 15/16* (2006.01)

(52) U.S. Cl.
USPC ............ 709/227; 709/217; 709/220; 709/230

(58) Field of Classification Search
USPC ......................................................... 709/227
See application file for complete search history.

(56) References Cited

U.S. PATENT DOCUMENTS

| | | | | |
|---|---|---|---|---|
| 6,704,786 | B1* | 3/2004 | Gupta et al. ................ | 709/228 |
| 7,174,385 | B2* | 2/2007 | Li ................................ | 709/231 |
| 7,395,306 | B1* | 7/2008 | Lai et al. ..................... | 708/700 |
| 7,680,051 | B2* | 3/2010 | Kumar et al. ................ | 370/236 |
| 7,719,967 | B2* | 5/2010 | Thakur ........................ | 370/229 |
| 8,179,904 | B2* | 5/2012 | Hidaka et al. ............... | 370/401 |
| 2004/0015591 | A1* | 1/2004 | Wang .......................... | 709/228 |
| 2005/0108397 | A1* | 5/2005 | Basso et al. .................. | 709/225 |
| 2010/0241731 | A1* | 9/2010 | Du et al. ...................... | 709/218 |
| 2012/0082158 | A1* | 4/2012 | Reddy et al. ................. | 370/389 |
| 2012/0257627 | A1* | 10/2012 | Nguyen et al. ............... | 370/392 |
| 2013/0194949 | A1* | 8/2013 | Ruddick et al. .............. | 370/252 |

OTHER PUBLICATIONS

Postel, Jon, Ed., "RFC:793, Transmission Control Protocol," DARPA Internet Program, Protocol Specification, Sep. 1981, prepared for Defense Advanced Research Projects Agency by Information Sciences Institute, Univ. of Southern California. Title page, Table of Contents, Preface, and pp. 1-85.

* cited by examiner

*Primary Examiner* — Michael Y Won
(74) *Attorney, Agent, or Firm* — Nelson Mullins Riley & Scarborough LLP (57) ABSTRACT

The subject matter of this disclosure can be implemented in, among other things, a method. In these examples, the method includes sending a request from a first network node to a second network node to request a bundled transport control protocol (TCP) connection between the first network node and the second network node, wherein the bundled TCP connection includes a group of member TCP connections associated with the bundled TCP connection. The method may also include receiving a response message with the first network node sent from the second network node, wherein the response message includes an indication of a status of the request, sending an acknowledgment message from the first network node to the second network node, and establishing the bundled TCP connection when the status of the request included in the response message indicates that the request is successful.

19 Claims, 6 Drawing Sheets

BUNDLED TRANSMISSION CONTROL PROTOCOL CONNECTIONS

TECHNICAL FIELD

The techniques of this disclosure relate to computer networking

BACKGROUND

A typical computer network, such as an Internet Protocol (IP) network, supports communications between various network devices. When two network devices communicate, the devices establish a communication session using a communication protocol, such as the Transmission Control Protocol (TCP). The TCP protocol is described in request for comments (RFC) 793, entitled "Transmission Control Protocol," to Information Sciences Institute of the University of Southern California, September 1981. In general, TCP connections may generate more overhead, smaller throughput, and longer delay than other types of protocols, such as User Datagram Protocol (UDP). Conventionally, to improve throughput, applications establish multiple TCP connections with a TCP server.

SUMMARY

In general, this disclosure is directed to techniques for bundling multiple logically related Transmission Control Protocol (TCP) connections between two processes, which may reside on two different devices, into a bundled TCP connection and managing these connections as one "bundled" TCP connection. When creating the bundled TCP connection, one or more existing TCP connections may be bundled together and additional TCP connections may be established and bundled with the existing TCP connections into the bundled TCP connection. Once the bundled TCP connection is created, additional TCP connections may be established and added to the bundled TCP connection and TCP connections included in the bundled TCP connection may be disconnected and removed from the bundled TCP connection. In general, the control information for all of the TCP connections included in the bundled TCP connection may be included one TCP control packet. Further, when sending data over the bundled TCP connection, two or more of the packet.

In one example, a method includes sending a request from a first network node to a second network node to request a bundled transport control protocol (TCP) connection between the first network node and the second network node, wherein the bundled TCP connection includes a group of member TCP connections associated with the bundled TCP connection. The method may also include receiving a response message with the first network node sent from the second network node, wherein the response message includes an indication of a status of the request, sending an acknowledgment message from the first network node to the second network node, and establishing the bundled TCP connection when the status of the request included in the response message indicates that the request is successful.

In another example, a computer-readable medium is encoded with instructions. The instructions cause one or more programmable processors of a computing system to send a request from the computing system to a second computing system to request a bundled transport control protocol (TCP) connection between the computing system and the second computing system, wherein the bundled TCP connection includes a group of member TCP connections associated with the bundled TCP connection. The instructions further cause the one or more programmable processors to receive a response message sent from the second computing system, wherein the response message includes an indication of a status of the request, send an acknowledgment message to the second computing system, and establish the bundled TCP connection when the status of the request included in the response message indicates that the request is successful.

In another example, a network node includes one or more programmable processors, means for send a request message from the network node to another network node to request a bundled transport control protocol (TCP) connection between the network node and the other network node, wherein the bundled TCP connection includes a set of member TCP connections, and a bundled TCP module. The bundled TCP module is executable by the one or more programmable processors to receive a response message with the first network node from the send network node, wherein the response message includes an indication of a status of the request, send an acknowledgment message with the first network node to the second network node, and establish the bundled TCP connection when the status of the request indicates that the request is successful.

The techniques of this disclosure may provide several advantages. For example, these techniques may enable two or more TCP connections between two devices to be bundled and managed as a single "bundled" TCP connection. By managing the TCP connections included in the bundled TCP connection as a single TCP connection, a single control packet may provide control information for two or more of the TCP connections in the bundled connection. For example, when any one TCP connection in the bundle receives an acknowledgement message, all of the TCP connections acknowledged in the single acknowledgment message can immediately send new data message without waiting for a separate acknowledgement message specific to each of the member TCP connections. Furthermore, if an acknowledgement message for one particular TCP connection included in the bundle is lost, an acknowledgement message for one of the other TCP connections included in the bundle may serve as the acknowledgement for the particular TCP connection. In this manner, the bundled TCP connection may achieve greater throughput, less delay, and reduced overhead as compared to conventional techniques for establishing and managing multiple different TCP connections between two hosts.

The details of one or more examples are set forth in the accompanying drawings and the description below. Other features, objects, and advantages will be apparent from the description and drawings, and from the claims.

DETAILED DESCRIPTION

Two processes may exchange information (e.g., data packets) by establishing a connection using the Transport Control Protocol (TCP) communication protocol. In some examples, a single TCP connection does not provide the desired amount of throughput. The two computing devices may establish multiple TCP connections in order to increase the throughput. Conventionally, each TCP connection that is established between the two computing devices is treated as a separate TCP connection even though the TCP connections are utilized to exchange information between the same two computing devices. By treating each TCP connection as a separate TCP connection, the overhead required to maintain the TCP connections may increase as the number of TCP connections increases, utilizing some of the additional bandwidth provided by the additional TCP connections. Further, because each TCP connection typically waits for control information corresponding to the respective TCP connection, the bandwidth provided by the additional TCP connections may be underutilized.

As described in further detail herein, the techniques of this disclosure may enable multiple TCP connections between two processes, which may reside on two different devices, to be bundled together into a bundled TCP connection. In general, a bundled TCP connection includes one or more TCP connections that are identified as members of the bundled TCP connection (or member TCP connections). The bundled TCP connection and the member TCP connections may be utilized by the computing devices and applications to transmit data and provide other functionality of a conventional TCP connection. The bundled TCP connection may reduce the amount of overhead required to maintain the member TCP connections, which may increase the throughput provided by the bundled TCP connection.

Figure 1:
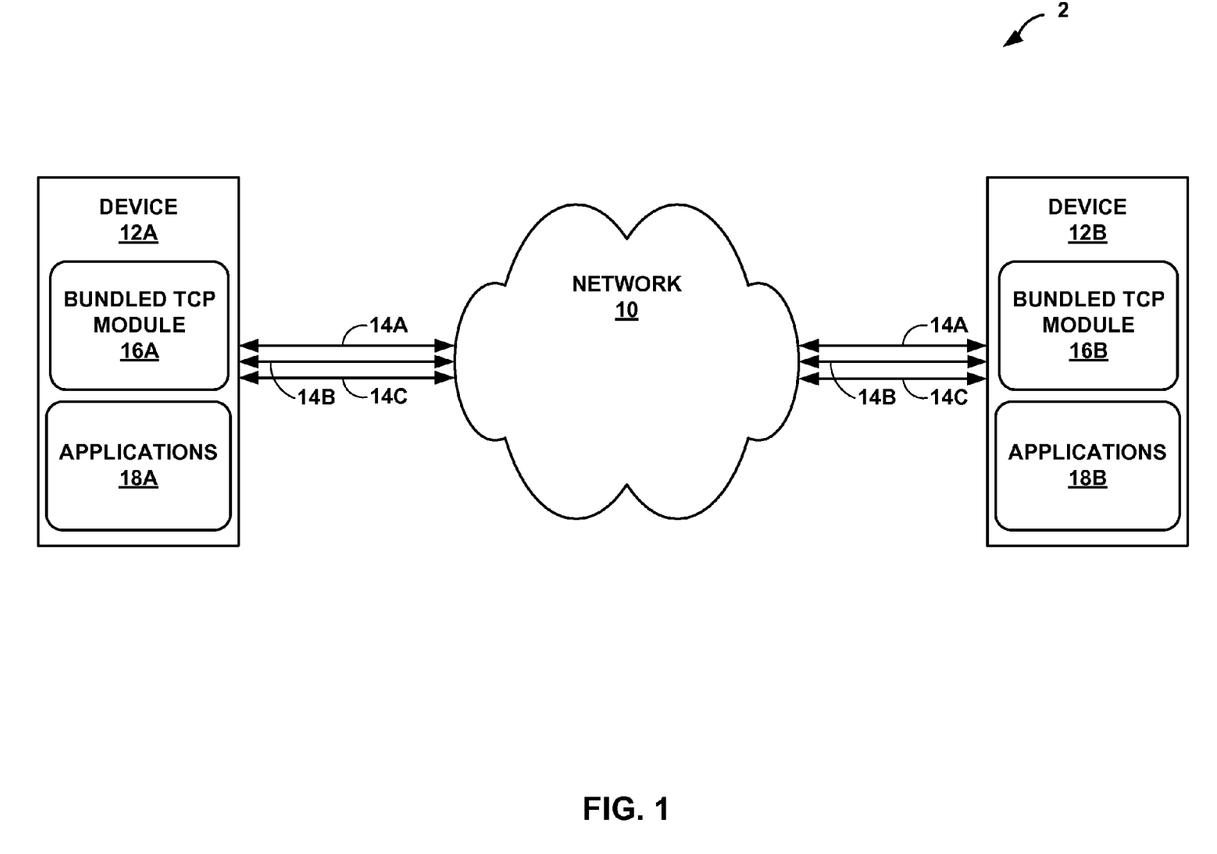
FIG. 1 is a block diagram illustrating one example network system, in accordance with one or more aspects of the present disclosure.

FIG. 1 is a block diagram illustrating one example network system 2, in accordance with one or more aspects of the present disclosure. As shown in FIG. 1, network system 2 includes network 10, devices 12A, 12B (collectively, "devices 12"), TCP connections 14A-14C (collectively, "TCP connections 14"). Examples of devices 12 include, but are not limited to, portable or mobile devices such as cellular phones, personal digital assistants (PDAs), laptop computers, tablet computers, portable gaming devices, portable media players, e-book readers, watches, as well as non-portable devices such as desktop computers, servers, such as web servers and specialized media servers, or other network devices.

Devices 12 are coupled to network 10 via wired and/or wireless links, including copper wires, coaxial cables, or fiber optic lines. Devices 12 may send data to or receive data from others of devices 12 via network 10. Network 10 may include a wide-area network (WAN) such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet).

Devices 12 may be configured to bundle two or more TCP connections (e.g., TCP connections 14) in accordance with techniques of this disclosure. As illustrated in FIG. 1, devices 12A and 12B include respective bundled TCP modules 16A and 16B (collectively, "bundled TCP modules 16") and respective applications 18A and 18B (collectively, "applications 18"). The example illustrated in FIG. 1 is one example configuration having a respective bundled TCP module 16 operating within each of devices 12. In other examples, the bundled TCP modules 16 may be arranged different and may reside in one or more different devices. For example, device 12A may include both of bundled TCP modules 16A and 16B.

Bundled TCP modules 16 may provide functionality to enable bundling of TCP connections 14. For example, device 12A may utilize bundled TCP module 16A to establish a bundled TCP connection with device 12B and bundled TCP module 16B. In this example, device 12A is considered the initiator of the bundled TCP connection because device 12A is initiating the establishment of a bundled TCP connection, and device 12B is considered the bundled TCP connection responder because device 12B is responding to the initial bundled TCP connection request message sent from device 12A to device 12B. In other examples, device 12B may initiate the bundled TCP connection and be considered the bundled TCP connection initiator while device 12A may response to the request message and be considered the bundled TCP connection responder.

Applications 18 may include instructions stored within a storage device of devices 12 that may be executed by one or more processors of devices 12. Applications 18 may be downloadable by a user or may be preprogrammed within each of devices 12. Applications 18 may be executed by devices 12 and may exchange information using one or more of TCP connections 14. Examples in this disclosure described as two devices exchanging information using one or more of TCP connections 14 may be applied to examples where two of applications 18 are exchanging information using one or more of TCP connections 14. That is, either a device or a software application may cause the formation of a bundled TCP connection and the exchange of information using the bundled TCP connection. In general, the term "network node" describes any device (e.g., device 12A) or software element (e.g. applications 18A) capable of acting as a TCP endpoint and exchanging information using a bundled TCP connection in accordance with techniques of this disclosure.

In accordance with one aspect of this disclosure, when establishing a bundled TCP connection, the TCP connection initiator endpoint (e.g., device 12A and bundled TCP module 16A) sends a request to establish the bundled TCP connection to a TCP connection responder endpoint (e.g., device 12B and bundled TCP module 16B). In one example, the request is a TCP synchronize (SYN) packet with an indication of setting up the TCP bundled connection. Upon receiving the request, bundled TCP module 16B of device 12B generates a response message that includes an indication of the state of the request and sends the response message to device 12A. The response message, in some instances, includes a TCP synchronize-acknowledgment (SYN-ACK) packet that includes an indication of the status of the bundled TCP request. The indication may, in some examples, include a status indicator of any of the following: not supported (e.g., device 12B does not support bundled TCP connections); not allowed; unknown failure; or success.

When the response includes an indication of not supported, not allowed, or unknown failure, bundled TCP module 16A may, in some instances, be configured to revert to the conventional techniques for establishing multiple member TCP connections. When the response includes a success indication, the success indication includes a bundled TCP connection endpoint identifier. A bundled TCP connection endpoint identifier is an identifier that identifies the endpoint of a bundled TCP connection and that is unique within the endpoint. To complete the establishment of the bundled TCP connection, the TCP connection endpoint initiator sends a TCP acknowledgment (ACK) message to the TCP responder, completing the three-handshake procedure to establish a new TCP connection.

Once the bundled TCP connection is established, techniques of this disclosure may enable one TCP control packet to be utilized to provide control information for one or more of the member TCP connections included in the bundled TCP connection. That is, in some examples, one TCP control packet may include control information for the bundled TCP connection and one or more of the member TCP connections included in the bundle. As one example, an ACK message may include acknowledgement numbers for one or more member TCP connections. By including multiple acknowledgement numbers in a single ACK message for the bundled TCP connection, a member TCP connection can send new data messages upon receiving an acknowledgment included in the bundled TCP ACK rather than waiting to receive an ACK message specific for the member TCP connection. Furthermore, if one ACK message is lost, member TCP connections may be acknowledged by the next ACK message. In various instances, providing control information for multiple TCP connections in a single control packet may reduce the number of packets required to provide the control information, reducing the media access control (MAC) and/or Internet Protocol (IP) headers used.

When sending data over the bundled TCP connection and the member TCP connections, all of the TCP connections included in the bundled TCP connection may, in various instances, transfer data simultaneously. Each member TCP connection as well as the bundled TCP connection use separate sequence number spaces. Thus, when sending data, one endpoint may check whether there is any data to send by each member connection and includes as much data as possible into one packet. Similarly, when receiving data, one endpoint checks whether the packet includes data for each member connection. The data for each member TCP connection may be processed using conventional TCP data processing techniques. Other processing, such as error handling, flow control, and congestion control, for each member TCP connection may also be processed using conventional TCP data processing techniques.

Additional member TCP connections may be established and associated with the bundled TCP connection. In general, member TCP connections may be established at the same time the bundled TCP connection is established or at any time after the TCP bundled connection is established but prior to the TCP bundled connection being disconnected. The procedure to establish a new member TCP connection in a bundled TCP connection includes an endpoint sending a TCP SYN packet, the responding endpoint sending a TCP SYN-ACK packet indicating that the request was successful, and the initiating endpoint sending a TCP ACK packet acknowledging the establishment of the member connection. The TCP SYN packet, in accordance with techniques of this disclosure, includes the member TCP connection endpoint identifier for both the initiator endpoint and the responder endpoint. In some examples, the member TCP connection endpoint identifier is a unique identifier among the member TCP connections within the bundled TCP connection and with respect to the particular endpoint (e.g., the initiator endpoint or the responder endpoint). In one example, the member TCP connection endpoint identifier is the same as the bundled TCP connection endpoint identifier for the bundled TCP connection.

Each member TCP connection within a bundled TCP connection may be disconnected without disconnecting any other member TCP connections or disconnecting the bundled TCP connection. To disconnect one or more of the member TCP connections while the bundled TCP connection is established, an endpoint of the TCP connection (e.g., one of devices 12A and 12B) sends a disconnection request (e.g., a TCP FIN packet) that includes the member TCP connection endpoint identifiers. Upon receiving the disconnection request, the recipient endpoint sends a TCP ACK packet to the initiating endpoint and closes the TCP connection. The TCP FIN packet and the TCP ACK packet each include one or more member TCP connection endpoint identifiers that identify the member TCP connections that are to be disconnected. A bundled TCP connection can exist and accept new member TCP connections even though all of the members of the bundled TCP connection have been disconnected.

When disconnecting a bundled TCP connection, an endpoint sends a bundled TCP connection disconnection request (e.g., a TCP FIN packet) to the other endpoint. The bundled TCP connection disconnection request includes the bundled TCP connection endpoint identifiers for each endpoint for the bundled TCP connection. The other endpoint replies with an ACK message to acknowledge the disconnection. When the bundled TCP endpoint is disconnected, all member TCP connections included in the bundle are also disconnected. The bundled TCP connection packets are further described below in reference to FIGS. 3 and 4.

Figure 2:
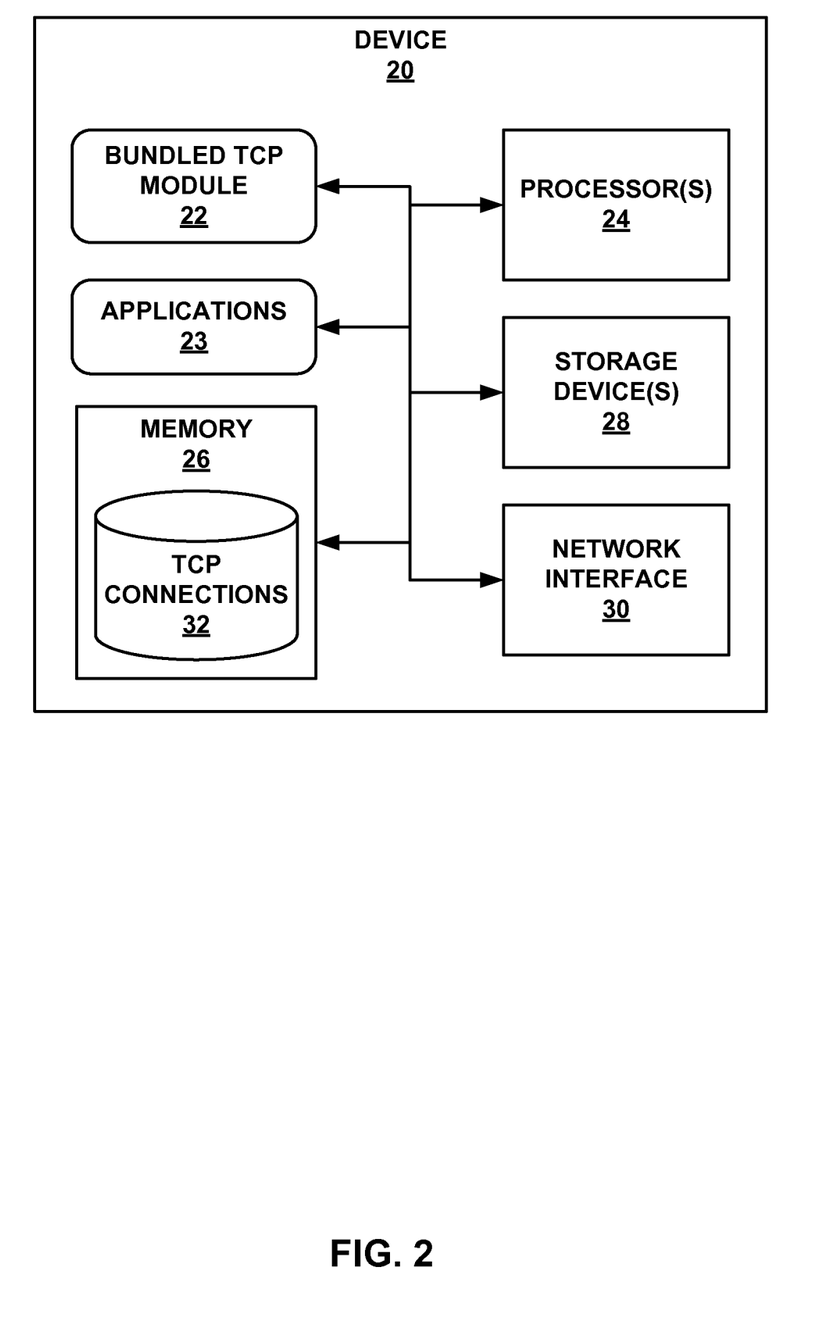
FIG. 2 is a block diagram illustrating an example network device, in accordance with one or more aspects of the present disclosure.

FIG. 2 is a block diagram illustrating an example computing device 20, in accordance with one or more aspects of the present disclosure. In some examples, device 20 may be configured similarly to, or the same as, one or both of devices 12A or 12B shown in FIG. 1. As shown in the example illustrated in FIG. 2, device 20 includes a bundled TCP module 22, applications 23, processors 24, memory 26, storage devices 28, and network interface 30. Components 22, 24, 26, 28, and 30 may be interconnected via one or more buses for inter-component communications. Processors 24 may be configured to implement functionality and/or process instructions for execution within device 20. Processors 24 may be capable of processing instructions stored in memory 26 or instructions stored on storage devices 28. Device 20 may utilize network interface 30 to communicate with external devices (e.g., one or more other computing devices, such as device 12B of FIG. 1) via one or more wired or wireless networks (e.g., network 10 of FIG. 1). For example, network interface 30 may be configured to communicate over, for example, Ethernet, transmission control protocol (TCP), Internet protocol (IP), asynchronous transfer mode (ATM), or other network communication protocols.

Memory 26 may be configured to store information within device 20 during operation. Memory 26 may, in various instances, be described as a computer-readable storage medium. In some examples, memory 26 is a temporary memory, meaning that a primary purpose of memory 26 is not long-term storage. Memory 26 may also be described as a volatile memory, meaning that memory 26 does not maintain stored contents when device 20 is turned off. Examples of volatile memories include random access memories (RAM), dynamic random access memories (DRAM), static random access memories (SRAM), and other forms of volatile memories known in the art. In some examples, memory 26 may be used by software or applications running on device 20 (e.g., software required to manage bundled TCP connections) to temporarily store information during program execution. As shown in FIG. 2, memory 26 includes TCP connections data store 32 that is configured to store information about one or more TCP connections for which device 20 acts as an endpoint.

Storage devices 28 stores instructions for applications 130 that may be executed by one or more processors 24 associated with device 20. For purposes of illustration only in the following description, applications 23 that may be executed by one or more processors 24 are described below as being executed by one processor 24. Applications 23 may be pre installed by a manufacturer of device 20, or may be downloaded by a user from a server via a network. Applications 23 may be executed by processor 24 in response to a user interacting with device 20 to execute the applications 23.

Storage devices 28 may also include one or more computer-readable storage media. Storage devices 28 may be configured to store larger amounts of information than memory 26. Storage devices 28 may be further configured for long-term storage of information, even when device 20 is not operating. In some examples, storage devices 28 may comprise non-volatile storage elements. Examples of such non-volatile storage elements may include magnetic hard disks, optical disks, floppy disks, flash memories, or forms of electronically programmable memories (EPROM) or electrically erasable and programmable memories (EEPROM).

Any applications implemented within or executed by device 20, e.g., bundled TCP module 22, may be implemented or contained within, operable by, executed by, and/or be operatively coupled to processors 24, memory 26, network interface 30 and/or storage devices 28. In some examples, bundled TCP module 22 may be a software application implemented by processors 24 and/or be a part of or controlled by an operating system of device 20. In other examples, bundled TCP module 22 may comprise firmware, analog circuitry, one or more processors, and/or one of or a portion of processors 24.

One example bundled TCP module 22 is shown in FIG. 2. Bundled TCP module 22 may be one example of bundled TCP modules 16A and 16B shown in FIG. 1 and may perform techniques previously attributed to bundled TCP modules 16A and 16B. In general, bundled TCP module 22 may enable device 20 to bundle multiple TCP connections between device 20 and another endpoint in accordance with techniques of this disclosure. That is, bundled TCP module 22 provides the functionality required to establish a bundled TCP connection, connect and disconnect member TCP connections, exchange data using all or a portion of the TCP connections included in the bundled TCP connection, perform error handling, flow control, and congestion control for each of the member TCP connections, and disconnect the bundled TCP connection. In some examples, bundled TCP module 22 may also provide conventional TCP functionality such that when device 20 is unable to establish a bundled TCP connection with a different endpoint, device 20 may revert to conventional techniques for establishing multiple TCP connections with the different endpoint.

Bundled TCP module 22, in various instances, generates outgoing TCP packets and processes incoming TCP packets. A TCP packet configured to support bundled TCP connections in accordance with one aspect of this disclosure, which may be referred to as bundled TCP packets, includes at least one header portion and one data portion. In some examples, each bundled TCP packet may include a plurality of header portions and a plurality of corresponding data portions. Each header portion may include one or more flags that indicate whether the header information corresponds to the bundled TCP connection or a member TCP connection that is associated with the bundled TCP connection. In this manner, one message (e.g., one control packet) may include information about multiple TCP connections associated with the bundled TCP connection.

Furthermore, the information included in the one message about each TCP connection may cause the receiving endpoint to perform different actions for each TCP connection. For example, the one message may cause a new member TCP connection to be established, a different member TCP connection to be close, and include data sent using still other member TCP connections. Example formats of bundled TCP packets configured in accordance with techniques of this disclosure are described in more detail with respect to FIGS. 3 and 4.

In one example, device 20 initiates the creation of a bundled TCP connection between device 20 and a responder endpoint (e.g., device 12B of FIG. 1). In this example, bundled TCP module 22 may generate a TCP SYN packet that includes information for establishing the bundled TCP connection. A TCP SYN packet configured in such a manner may be referred to as a bundled TCP SYN packet. The bundled TCP SYN packet includes a header portion corresponding to the bundled TCP connection being established. The header portion includes an initiator bundled TCP endpoint identifier that is unique within device 20, a responder bundled TCP endpoint identifier that is unique within the responder endpoint, and an indication that the packet is for establishing a bundled TCP connection. In one example, the initiator bundled TCP endpoint identifier may be the same as the source port on device 20 utilized for the bundled TCP connection, and the responder bundled TCP endpoint identifier may be the same as the destination port on the responder endpoint utilized for the bundled TCP connection.

Bundled TCP module 22 may also include information about one or more member TCP connections in the same bundled TCP SYN packet used to establish the bundled TCP connection in order to establish one or more member TCP connections at the same time the bundled TCP connection is established. The same bundled TCP SYN packet may also include an additional header portion for each member TCP connection to be established. The header portion for each member TCP connection includes a member TCP connection endpoint identifier and an indication that the header is for establishing a member TCP connection. The member TCP connection endpoint identifier is unique between the member TCP connections associated with the bundled TCP connection. That is, the member TCP connection endpoint identifiers, in various instances, may not be unique between multiple different bundled TCP connections.

In some examples, one of the member TCP connection endpoint identifiers may be the same as the bundled TCP connection identifier. In other examples, the member TCP connection endpoint identifiers may be a randomly generated number or one of a sequential set of numbers, or any other value that is unique between the member TCP connections associated with the bundled TCP connection.

Continuing the example where device 20 acts as an initiator endpoint, after sending the bundled TCP SYN packet, device 20 receives a response message from the responder endpoint. The response message is typically in the form of a TCP SYN-ACK packet, which, when configured to support bundled TCP connections, may be referred to as a bundled TCP SYN-ACK packet. The bundled TCP SYN-ACK packet includes an indication as to the status of the request to establish the bundled TCP connection with device 20. In one example, the status of the request may be one of not supported, not allowed, unknown failure, or success. The bundled TCP SYN-ACK packet may also include an indication as to the status of the request to establishing the one or more member TCP connections specified in the TCP SYN packet.

Bundled TCP module 22 processes the bundled TCP SYN-ACK packet and generates a response message to send to the responder endpoint based on the TCP SYN-ACK packet. If the bundled TCP SYN-ACK packet indicates success for the bundled TCP connection, bundled TCP module 22 replies with a bundled TCP ACK packet acknowledging the establishment of the bundled TCP connection with the responder endpoint. For each member TCP connection for which the bundled TCP SYN-ACK packet indicated success, bundled TCP module 22 includes an acknowledgment in the bundled TCP ACK packet. If the TCP SYN-ACK packet indicates something other than success (e.g., not supported), bundled TCP module 22 may be configured to revert to utilizing conventional multiple TCP connection techniques and would attempt to establish each of the TCP connections that may have been included in the bundled TCP connection using the conventional techniques.

In another example, device 20 acts a responder endpoint (e.g., device 12B of FIG. 1) and receives a bundled TCP SYN packet from an initiator endpoint (e.g., device 12A of FIG. 1) when the initiator endpoint attempts to establish a bundled TCP connection with device 20. In this example, bundled TCP module 22 receives the bundled TCP SYN packet via network interface 30 from the initiator endpoint and processes the bundled TCP SYN packet to extract the header information for the bundled TCP connection and the header information for any member TCP connections that may be included in the bundled TCP SYN packet. Bundled TCP module 22 generates a response message (e.g., a bundled TCP SYN-ACK packet) that includes a status of the request for the bundled TCP connection and any member TCP connections included in the bundled TCP SYN packet and sends the response message to the initiator endpoint.

Once the bundled TCP connection is established, bundled TCP module 22 may exchange data with the other endpoint (e.g., device 12B), establish additional member TCP connections associated with the bundled TCP connection, disconnect one or more of the previously established member TCP connections, or disconnect the bundled TCP connection. When sending data to the other endpoint, bundled TCP module 22 may transfer the data simultaneously using the bundled TCP connection and one or more of the member TCP connections associated with bundled TCP connection. Bundled TCP module 22 may check to determine whether there is any data to send for each member TCP connection and include as much data for as many member TCP connections as will fit in one packet. The size of the packet may be limited by the size of the maximum transmission unit (MTU) supported by either endpoint or one or more intermediate network devices (e.g., a router located in network 10 of FIG. 1).

The bundled TCP connection and member connections may, according to some examples, utilize sequence numbers for every octet of data sent over the bundled TCP connection and each of the member TCP connections. In these examples, the bundled TCP connection and each of the member TCP connections utilize separate sequence number spaces. When generating the bundled TCP packet for sending data over the bundled TCP connection and member TCP connections, bundled TCP module 22 generates header information for the bundled TCP connection and each member TCP connection used to send data. The header information for each TCP connection includes a sequence number and an indication of whether the header corresponds to the bundled TCP connection or one of the member TCP connections. After generating the header information and including the data for each member TCP connection, bundled module 22 sends the bundled TCP packet to the other endpoint via network interface 30.

When the receiving endpoint receives the bundled TCP packet, the receiving endpoint extracts the data and sends a response message that includes acknowledgment information for each of the sequence numbers included in the bundled TCP packet. For example, when device 20 receives a bundled TCP packet from another endpoint, bundled TCP module 22 extracts the data and the sequence number for the bundled TCP connection and each of the member TCP connections included in the bundled TCP packet, generates an acknowledgment number for each of the sequence numbers included in the bundled TCP packet, and sends the bundled TCP ACK packet to the other endpoint. The data included in the bundled TCP connection and each member TCP connection may be processed by bundled TCP module 22 based on conventional TCP data processing techniques. In some examples, the bundled TCP connection is not utilized to send data. Instead, data is only sent using the one or more member TCP connections associated with the bundled TCP connection.

In some instances, bundled TCP module 22 may establish additional member TCP connections associated with an already established bundled TCP connection. In order to establish the additional member TCP connections, bundled TCP module 22 generates a bundled TCP packet that includes header information for the bundled TCP connection as well as a set of header information for each additional member TCP connection that is to be established and associated with the bundled TCP connection. The member TCP connection header information includes a separate sequence number that is generated by bundled TCP module 22 independently from any other member TCP connection as well as an indication (e.g., a flag) that indicates to the responder endpoint that the member TCP connection needs to be created.

The responder endpoint processes the bundled TCP packet, identifies the member TCP connections that are to be established, generates a response message (e.g., another bundled TCP packet) that includes header information for each of the member TCP connections to be established based on the received TCP packet in a manner similar to that described above with respect to establishing the initial bundled TCP connection and member TCP connections, and sends the bundled TCP packet to device 20. The header information for the member TCP connections to be established included in the bundled TCP packet includes acknowledgment information acknowledging the request to establish the member TCP connection as well as a sequence number to be acknowledged by device 20. Bundled TCP module 22 receives the bundled TCP SYN-ACK packet, processes the bundled TCP SYN-ACK packet, generates a corresponding bundled TCP ACK packet based on the bundled TCP SYN-ACK packet in a manner similar to that described above with respect to establishing the initial bundled TCP connection and member TCP connections, and sends the bundled TCP ACK packet to the responder endpoint.

In accordance with techniques of this disclosure, one or more existing member TCP connections may be disconnected without disconnecting the bundled TCP connection or other member TCP connections. Bundled TCP module 22 generates a request message (e.g., a bundled TCP FIN packet) to close one or more of the member TCP connections. The bundled TCP FIN packet includes header information for the bundled TCP connection as well as header information for each of the member connections to be closed (disconnected).

The receiving endpoint processes the bundled TCP FIN packet, generates a bundled TCP ACK packet that includes an acknowledgment for each of the member TCP connections to be closed, and sends the bundled TCP ACK packet to device 20.

In order to close the bundled TCP connection, bundled TCP module 22 generates a request message (e.g., a bundled TCP FIN packet) and sends the bundled TCP FIN packet to the other endpoint. In one example, the bundled TCP FIN packet includes a header portion for the bundled TCP connection that indicates that the bundled TCP connection should be closed, but does not include header portions for each of the member TCP connections. In another example, the bundled TCP FIN packet includes a header portion for the bundled TCP connection as well as header portions for each of the member TCP connections, where each of the header portions indicate that the bundled TCP connection and the member TCP connections, respectively, are to be closed.

Upon receiving the bundled TCP FIN packet, the receiving endpoint generates a bundled TCP ACK packet that includes acknowledgments for the bundled TCP connection and, if appropriate, the member TCP connections, and sends the bundled TCP ACK packet to device 20. When device 20 receives a bundled TCP FIN packet to close one or more member TCP connections or the bundled TCP connection, bundled TCP module 22 may perform the techniques described above with respect to the receiving endpoint.

While described above as one bundled TCP packet having a particular type (e.g., bundled TCP ACK packet, bundled TCP SYN-ACK packet, bundled TCP SYN packet, and bundled TCP FIN packet), techniques of this disclosure do not limit each bundled TCP packet to only having one particular type. Each bundled TCP packet may include header information for the bundled TCP connection and one or more member TCP connections that cause the receiving endpoint to perform different actions for each TCP connection. For example, one bundled TCP packet may include first header information and data that acknowledges the establishment of a new member TCP connection, second header information and data that closes an existing member TCP connection, and third header information and data that sends data over yet another member TCP connection.

Furthermore, the number of member TCP headers included in the bundled TCP packet may be calculated based on the length of the bundled TCP packet and the length of the bundled TCP header. The number of member TCP headers included in the bundled TCP packet may correspond to the number of member TCP connections for which the bundled TCP packet includes control information. In this manner, one control packet (e.g., one bundled TCP packet) may be utilized for two or more TCP connections, which may increase the throughput and reduce overhead as compared to conventional techniques for establishing and managing multiple TCP connections between two hosts.

Figure 3:
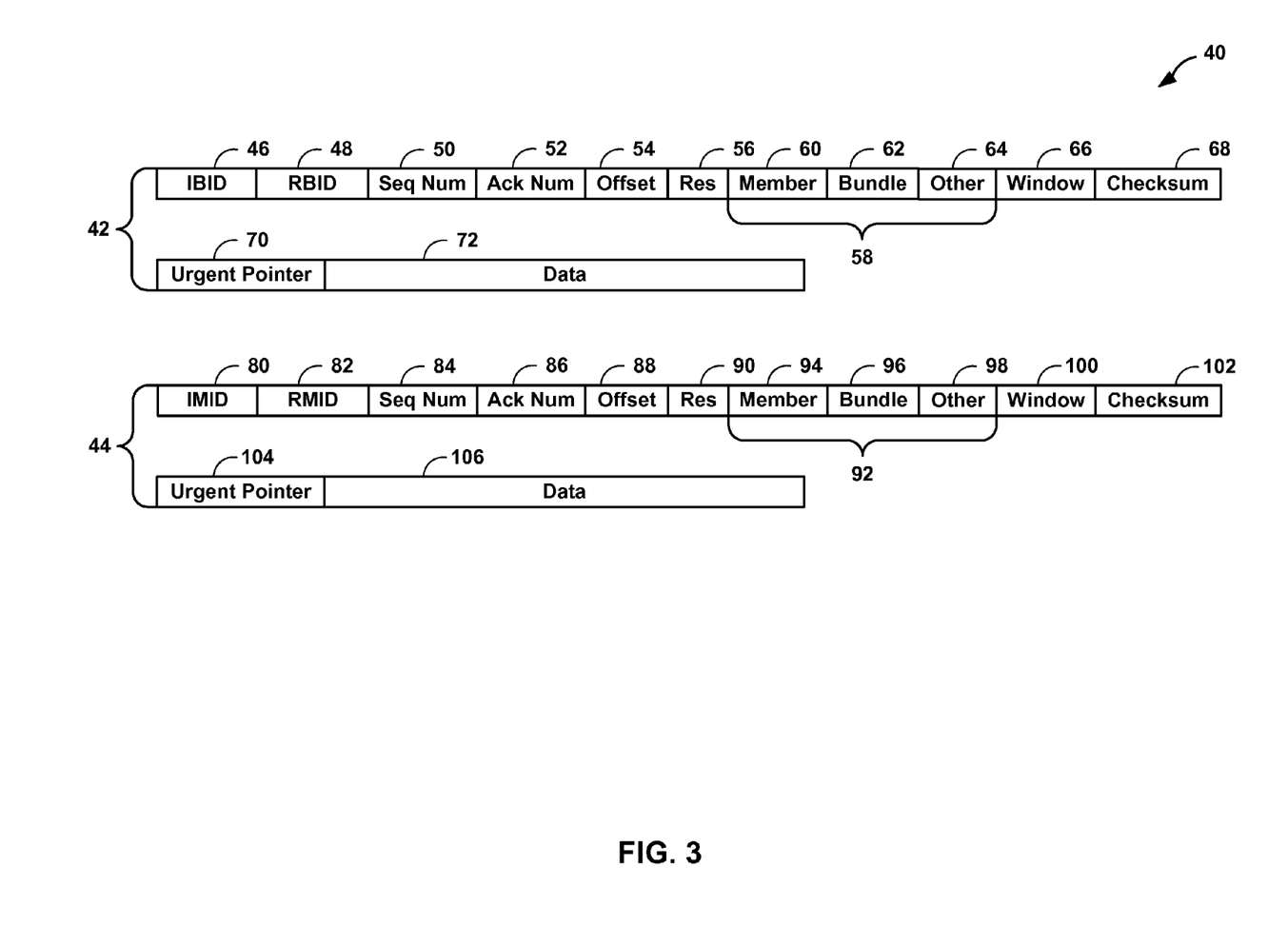
FIG. 3 is an example transmission control protocol (TCP) packet, in accordance with one or more aspects of the present disclosure.

FIG. 3 is an example bundled TCP packet 40, in accordance with one or more aspects of the present disclosure. For purposes of illustration, the example bundled TCP packet 40 is described with respect to network system 2 of FIG. 1 and device 20 of FIG. 2. As illustrated in FIG. 3, bundled TCP packet 40 utilizes two new flags, a member flag and a bundle flag, to indicate whether each set of header and data information is for a bundled TCP connection or a member TCP connection. Bundled TCP packet 40 includes bundled TCP connection information 42 and member TCP connection information 44. While bundled TCP packet 40 is illustrated in FIG. 3 as including one member TCP connection information 44, in other examples, bundled TCP packet 40 may include information about two or more different member TCP connections.

Bundled TCP connection information 44 includes initiator bundle endpoint identifier (IBID) 46, responder bundle endpoint identifier (RBID) 48, sequence number (SEQ NUM) 50, acknowledgment number (ACK NUM) 52, data offset 54, reserved bits (RES) 56, flags 58, window 66, checksum 68, urgent pointer 70 and data 72. In some examples, initiator bundle endpoint identifier 46 may be the same as the source port of the initiator device and responder bundled endpoint identifier 48 may be the same as the destination port of the responder device, where the source port and the destination ports are the ports over which a connection will be or is currently established between the initiator device (e.g., device 20) and the responder device. In examples where bundled TCP connection information 44 does not include any information in data 72, data offset 54 may be an optional field.

Initiator bundled endpoint identifier 46 is a unique value within the initiator endpoint and responder bundle endpoint identifier 48 is a unique value within the responder endpoint. Sequence number 50, acknowledgement number 52, data offset 54, reserved bits 56, window 66, checksum 68, urgent pointer 70 and data 72 may each be configured in accordance with the TCP standard.

Flags 58 include member flag 60, bundle flag 62, and other flags 64. Other flags 64 may include conventional TCP control bits that signal the receiving endpoint that the urgent pointer field is significant, the acknowledgment field is significant, a push function, to reset the connection, to synchronize sequence number, or that no more data is going to be sent from the sender. The control bits may determine which type of packet bundled TCP packet 40 may be referred to in this disclosure. For example, if the control bits signal that the acknowledgment field is significant, bundled TCP packet 40 may be referred to as a bundled TCP ACK packet. However, because bundled TCP packet 40 may include multiple different headers for multiple different member TCP connections, the control bits only provide control information for the particular header and data set in which the control bits appear (e.g., the control bits of other flags 64 only provide control information for bundled TCP connection information 44).

Member flag 60 and bundle flag 62 may be utilized to signal whether the header and data set are for a bundled TCP connection or a member TCP connection. Typically, if member flag 60 is set to a significant value (e.g., the value one), bundle flag 62 is set to a value that is not significant (e.g., the value zero). Similarly, when bundle flag 62 is set to a value that is significant, member flag 60 is generally set to a value that is not significant. For example, bundled TCP connection information 42 may be identified as including a header and data set for the bundled TCP connection because member flag 60 is set to the value zero and bundle flag 62 is set to the value one. In this example, device 20 interprets initiator bundle endpoint identifier field 46 and responder bundle endpoint identifier field 48 as bundle TCP connection identifiers because bundle flag 62 is set to the value one. Member flag 60 and bundle flag 62 enable bundled TCP module 22 to include, in one packet, information for multiple related TCP connections (e.g., a bundled TCP connection and the one or more member TCP connections associated with the bundled TCP connection).

Member TCP connection information 44 includes initiator member endpoint identifier (IMID) 80, responder member endpoint identifier (RMID) 82, sequence number (SEQ NUM) 84, acknowledgment number (ACK NUM) 86, data offset 88, reserved bits (RES) 90, flags 92, window 100, checksum 102, urgent pointer 104 and data 106. Sequence number 84, acknowledgment number 86, data offset 88, reserved bits 90, window 100, checksum 102, urgent pointer 104 and data 106 may each be configured in accordance with the TCP standard. In some examples, sequence number 84, acknowledgment number 86, window 100, checksum 102, and urgent pointer 104 may each be optional fields of member TCP connection information 44. In these examples, device 20 may rely upon the corresponding fields of bundled TCP connection information (e.g., sequence number 50, acknowledgment number 52, window 66, checksum 68, and urgent pointer 70) to provide the information that would otherwise be stored in fields 84, 86, 100, 102, 104, and 106.

Initiator member endpoint identifier 80 and responder member endpoint identifier 82 are each set to a value that is unique within the member TCP connections associated with the bundled TCP connection. That is, initiator member endpoint identifier 80 must be set to a value that is unique among the initiator member identifiers of all of the member TCP connections associated with the bundled TCP connection identified by bundled TCP connection information 42.

Similarly, responder member endpoint identifier 82 is set to a value that is unique among the responder member identifiers of all of the member TCP connections associated with the bundled TCP connection. In one example, initiator member endpoint identifier 80 and responder member endpoint identifier 82 may be set to the same value. In another example, initiator member endpoint identifier 80 may be set to the same value as initiator bundle endpoint identifier 46 and responder member endpoint identifier 82 may be set to the same value as responder bundle endpoint identifier 48.

Flags 92 include member flag 94, bundle flag 96, and other flags 98. Other flags 98 may include control bits as described above with respect to other flags 64. Member flag 94 and bundle flag 96 may each be set to a value that indicates whether the header information corresponds to a member TCP connection or a bundled TCP connection. In the example illustrated in FIG. 3, because member flag 94 and bundled flag 96 are included in member TCP connection information 44, member flag 94 is set to a value that indicates the header information is for a member TCP connection (e.g., the value one) and bundle flag 96 is set to a value that indicates the header information is not for a bundled TCP connection (e.g., the value zero). When member flag 94 is set to the value one, device 20 may interpret initiator member endpoint identifier 80 and responder member endpoint identifier 82 as member TCP connection identifiers because member flag 94 is set to the value one. In general each bundled TCP packet includes one set of bundled TCP information and one or more sets of member TCP connection information for the member TCP connections.

Figure 4:
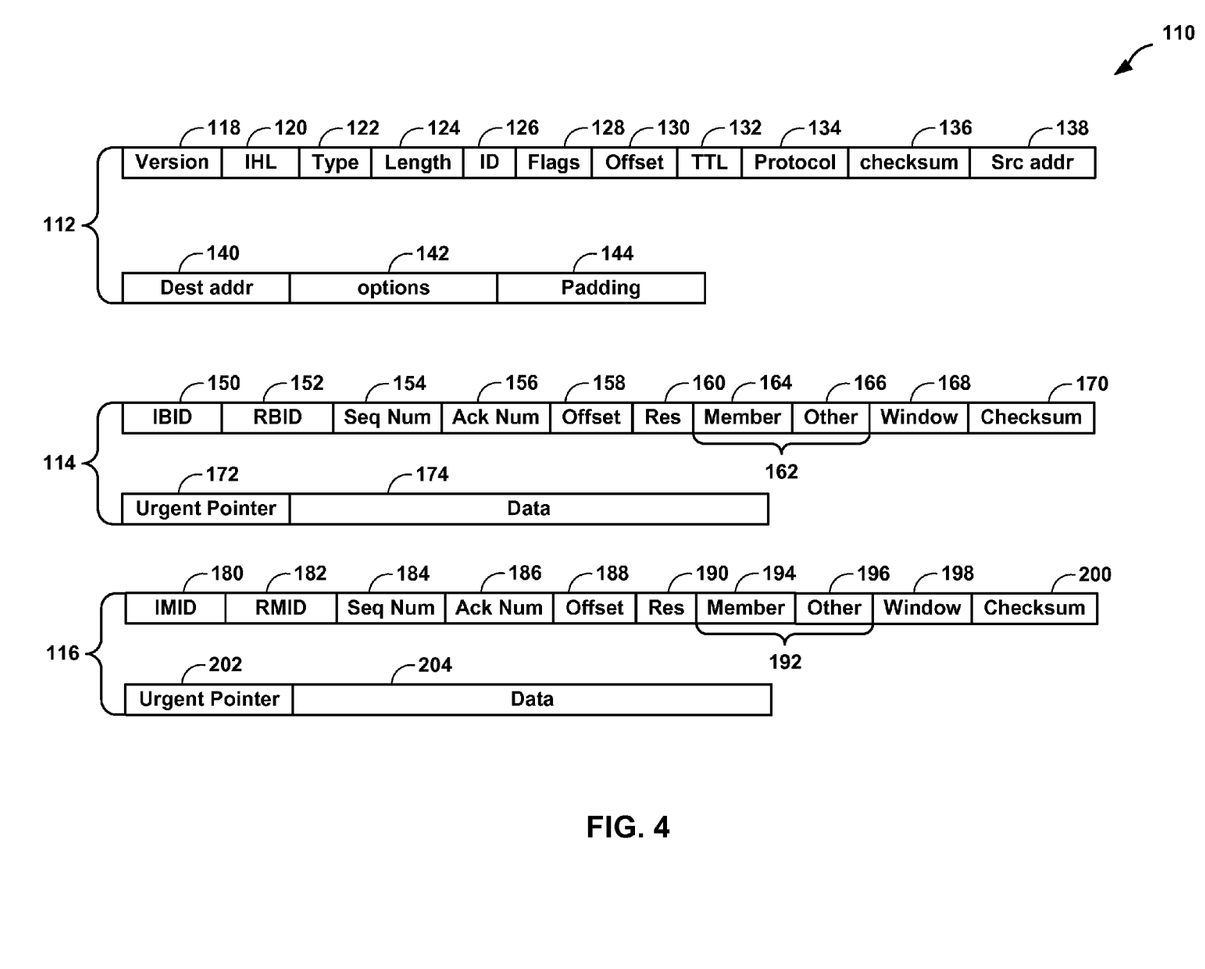
FIG. 4 is a second example TCP packet, in accordance with one aspect of the present disclosure.

FIG. 4 is a second example bundled TCP packet 110, in accordance with one or more aspects of the present disclosure. For purposes of illustration, the example bundled TCP packet 40 is described with respect to network system 2 of FIG. 1 and device 20 of FIG. 2. As illustrated in FIG. 4, bundled TCP packet 110 includes an Internet Protocol version 4 (IPv4) header 112 that is configured with a new protocol to indicate that the packet is for a bundled TCP connection. IPv4 is described in request for comments (RFC) 791, entitled "Internet Protocol" to Jon Postel et al., September 1981. Bundled TCP packet 110 also includes bundled TCP connection information 114 and member TCP connection information 116 each of which includes a new flag to indicate whether the header and data set of information is for a bundled TCP connection or a member TCP connection. While bundled TCP packet 110 is illustrated in FIG. 4 as including one member TCP connection information 116, in other examples, bundled TCP packet 110 may include information about two or more different member TCP connections.

IPv4 header 112 includes version 118, Internet header length (IHL) 120, type of service 122, length 124, identification (ID) 126, flags 128, fragment offset 130, time to live (TTL) 132, protocol 134, header checksum 136, source address (SRC ADDR) 138, destination address (DEST ADDR) 140, options 142, and padding 144. Each of the fields 118, 120, 122, 124, 126, 128, 130, 132, 136, 138, 140, 142, and 144 may be configured in accordance with the IPv4 standard. Protocol 134 is configured to indicate the next level protocol used in the data portion of bundled TCP connection packet 110. In accordance with the techniques of this disclosure, a new protocol is configured, the bundled TCP protocol, and protocol 134 is configured with a new value that corresponds to the bundled TCP protocol. Bundled TCP connection information 114 and member TCP connection information 116 are included in the data portion of bundled TCP connection packet 110. When bundled TCP module 22 receives bundled TCP connection packet 110, bundled TCP module 22 processes IPv4 header 112 and identifies the information included in the data portion as being configured in accordance with the bundled TCP protocol based on the value of protocol 134.

Bundled TCP connection information 114 includes initiator bundle endpoint identifier (IBID) 150, responder bundle endpoint identifier (RBID) 152, sequence number (SEQ NUM) 154, acknowledgment number (ACK NUM) 156, data offset 158, reserved bits (RES) 160, flags 162, window 168, checksum 170, urgent pointer 172 and data 174. Sequence number 154, acknowledgement number 156, data offset 158, reserved bits 160, window 168, checksum 170, urgent pointer 172 and data 174 may each be configured in accordance with the TCP standard. Initiator bundle endpoint identifier 150 must be a unique value within the initiator endpoint and responder bundle endpoint identifier 152 must be a unique value within the responder endpoint. In some examples, initiator bundle endpoint identifier 150 may be the same as the source port of the initiator device and responder bundle endpoint identifier 152 may be the same as the destination port of the responder device, where the source port and the destination ports are the ports over which a connection will be or is currently established between the initiator device (e.g., device 20) and the responder device.

Flags 162 include member flag 164 and other flags 166. Member flag 164 is configured to signal whether the header information corresponds to a member TCP connection or a bundled TCP connection. Because member flag 164 is included within bundled TCP connection information 114, member flag 164 is set to a value that indicates that the information corresponds to a bundled TCP connection (e.g., the value zero). Other flags 166 may include conventional TCP control bits as described above with respect to other flags 64 of FIG. 3.

Member TCP connection information 116 includes initiator member endpoint identifier (IMID) 180, responder member endpoint identifier (RMID) 182, sequence number (SEQ NUM) 184, acknowledgment number (ACK NUM) 186, data offset 188, reserved bits (RES) 190, flags 192, window 198, checksum 200, urgent pointer 202 and data 204. Initiator member endpoint identifier 180 and responder member endpoint identifier 182 are each set to a value that is unique within the member TCP connections associated with the bundled TCP connection. That is, initiator member endpoint identifier 180 must be set to a value that is unique among the initiator member endpoint identifiers of all of the member TCP connections associated with the bundled TCP connection identified by bundled TCP connection information 114. Similarly, responder member endpoint identifier 182 is set to a value that is unique among the responder member identifiers of all of the member TCP connections associated with the bundled TCP connection. In one example, initiator member endpoint identifier 180 and responder member endpoint identifier 182 may be set to the same value. In another example, initiator member endpoint identifier 180 may be set to the same value as initiator bundle endpoint identifier 150 and responder member endpoint identifier 182 may be set to the same value as responder bundle endpoint identifier 152.

Flags 192 include member flag 194 and other flags 196. Member flag 192 is configured to signal whether the header information corresponds to a member TCP connection or a bundled TCP connection. Because member flag 192 is included within member TCP connection information 116, member flag 192 is set to a value that indicates that the information corresponds to a member TCP connection (e.g., the value one). Other flags 196 may include conventional TCP control bits as described above with respect to other flags 64 of FIG. 3.

While bundled TCP packet 110 is illustrated in FIG. 4 as being configured in accordance with IPv4 and including an IPv4 header, in other examples, bundled TCP packet 110 may be configured in accordance with Internet Protocol version 6 (IPv6), as described in RFC 2460, entitled "Internet Protocol, Version 6 (IPv6) Specification" to S. Deering et al., December 1998. When configured in accordance to IPv6, bundled TCP packet 110 includes an IPv6 header instead of an IPv4 header. The IPv6 header includes a next header field that is configured to identify the next header included in the packet. In accordance with the techniques of this disclosure, the next header field is configured to include a new value corresponding to a bundled TCP connection header. That is, the next header field of the IPv6 header identifies the header portion of bundled TCP connection information 114 as a bundled TCP connection header. For example, when bundled TCP module 22 receives bundled TCP connection packet 110, bundled TCP module 22 processes the IPv6 header and utilizes the next header field to determine how to process the next header included in bundled TCP connection packet 110. In this example, the next header field causes bundled TCP module 22 to process bundled TCP connection information 114 as information for a bundled TCP connection.

Figure 5:
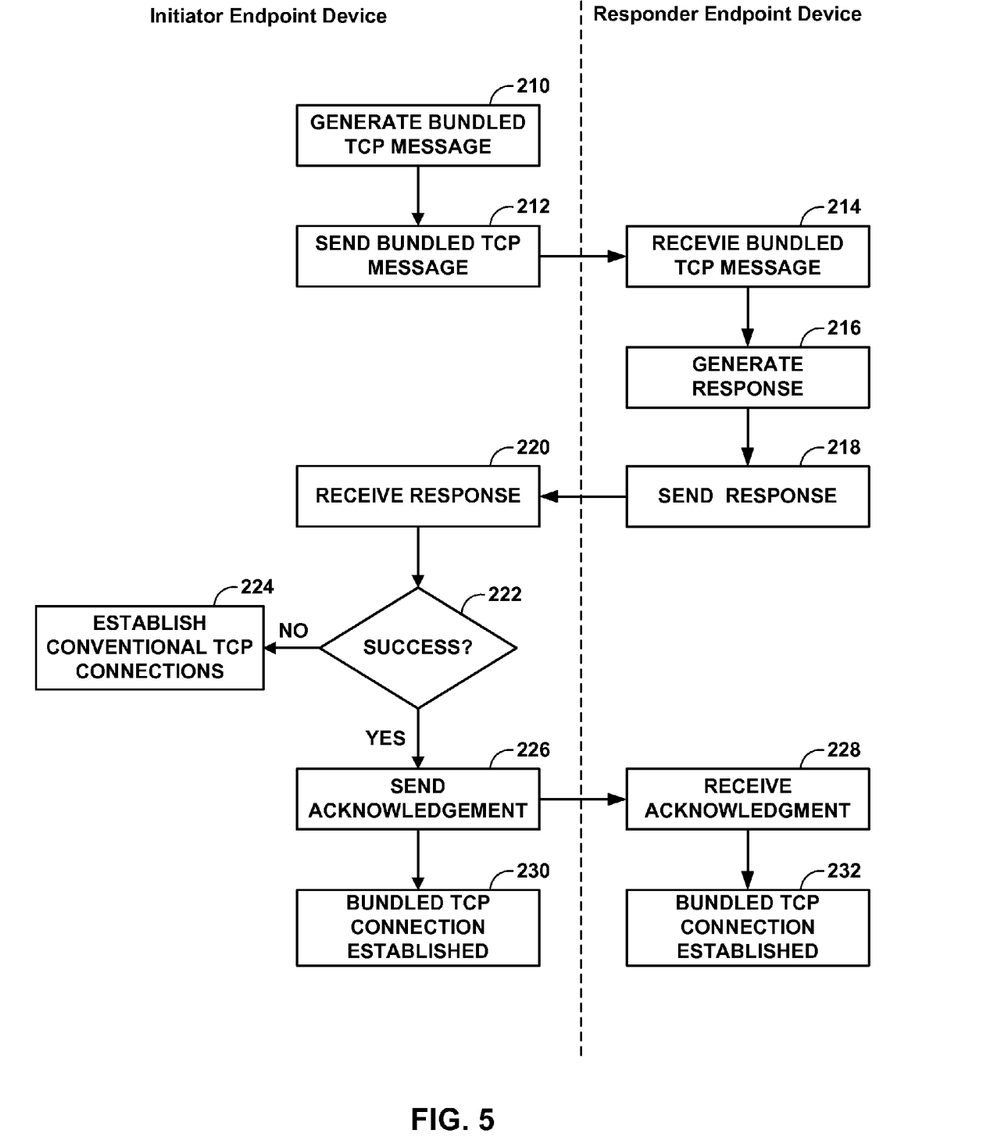
FIG. 5 is a flowchart illustrating an example method for establishing a bundled TCP connection, in accordance with one or more aspects of the present disclosure.

FIG. 5 is a flowchart illustrating an example method for establishing a bundled TCP connection, in accordance with one or more aspects of the present disclosure. For purposes of illustration only, the example method is described below within the context of network system 2 of FIG. 1 and device 20 of FIG. 2, though various other systems and/or devices may be utilized to implement or perform the method shown in FIG. 5.

In the example illustrated in FIG. 5, bundled TCP module 22 of device 20 acts as the initiator endpoint and generates a bundled TCP message (210) configured to start the bundled TCP connection establishment procedure. The bundled TCP message includes at least one bundled TCP header portion and one bundled TCP data portion that corresponds to the bundled TCP connection bundled TCP module 22 is attempting to establish. In general, bundled TCP module 22 may generate a bundled TCP message configured in accordance to any of the examples described with respect to FIGS. 3 and 4. For example, within the bundled TCP header portion, a bundle flag is set to the value one and a member flag is set to the value zero. As another example, the message includes an IPv4 header having a protocol field set to a value that corresponds to a bundled TCP protocol. As another example, the message includes an IPv6 header that includes a next header field that is set to a value that identifies the next header of the message as a bundled TCP header. Bundled TCP connection information is included in the message following the IPv4 header or IPv6 header, respectively.

Device 20 sends the generated bundled TCP message to the responder endpoint (e.g., device 12B of FIG. 1 where device 20 corresponds to device 12A) via network interface 30 (212). The responder endpoint receives the bundled TCP message (214) and generates a response message (216). In order to generate the response message, the responder endpoint processes the received bundled TCP message. If the responder endpoint is not configured to support bundled TCP connections or if an error is generated, the responder endpoint generates response message that indicates that the request to establish the bundled TCP connection was not successful.

If the responder endpoint was able to establish the bundled TCP connection, the response message includes an indication of success. The response message may include an indication of success or failure for the bundled TCP connection as well as a separate indication of success of failure for each of the member TCP connections associated with the bundled TCP connection that may be established at approximately the same time as the bundled TCP connection. The status for the bundled TCP connection may be different than the status for one or more of the member TCP connections and the status for each of the member TCP connections may be different than other member TCP connections. The responder endpoint then sends the response message to device 20 (218).

Device 20 receives (220) the response message from the responder endpoint and determines (222) if the response message includes an indication of success or failure. If the response message indicates failure (e.g., that the responder endpoint does not support bundled TCP connections) ("NO" branch of 222), device 20 may be configured to revert to conventional TCP techniques for establishing multiple TCP connections between device 20 and the responder endpoint (224). If the response message indicates success ("YES" branch of 222), bundled TCP module 22 generates and sends an acknowledgment message to the responder endpoint (226). The acknowledgement message includes an acknowledgment for the bundled TCP connection and each of the member TCP connections for which a status was included in the response message. That is, the acknowledgment message acknowledges the establishment of the bundled TCP connection and any member TCP connections.

After device 20 sends the acknowledgment message, device 20 establishes the bundled TCP connection and any member TCP connections (230) and begins to listen for data or send data using those connections. The responder endpoint receives the acknowledgment message from device 20 (228). Once the responder endpoint receives the acknowledgment message (228), the responder device establishes the bundled TCP connection and any member TCP connections and begins to listen for data or send data using the connections. While device 20 is described as the initiator endpoint with respect to the example method shown in FIG. 5, device 20 may also perform one or more of the techniques described with respect to the responder endpoint.

Figure 6:
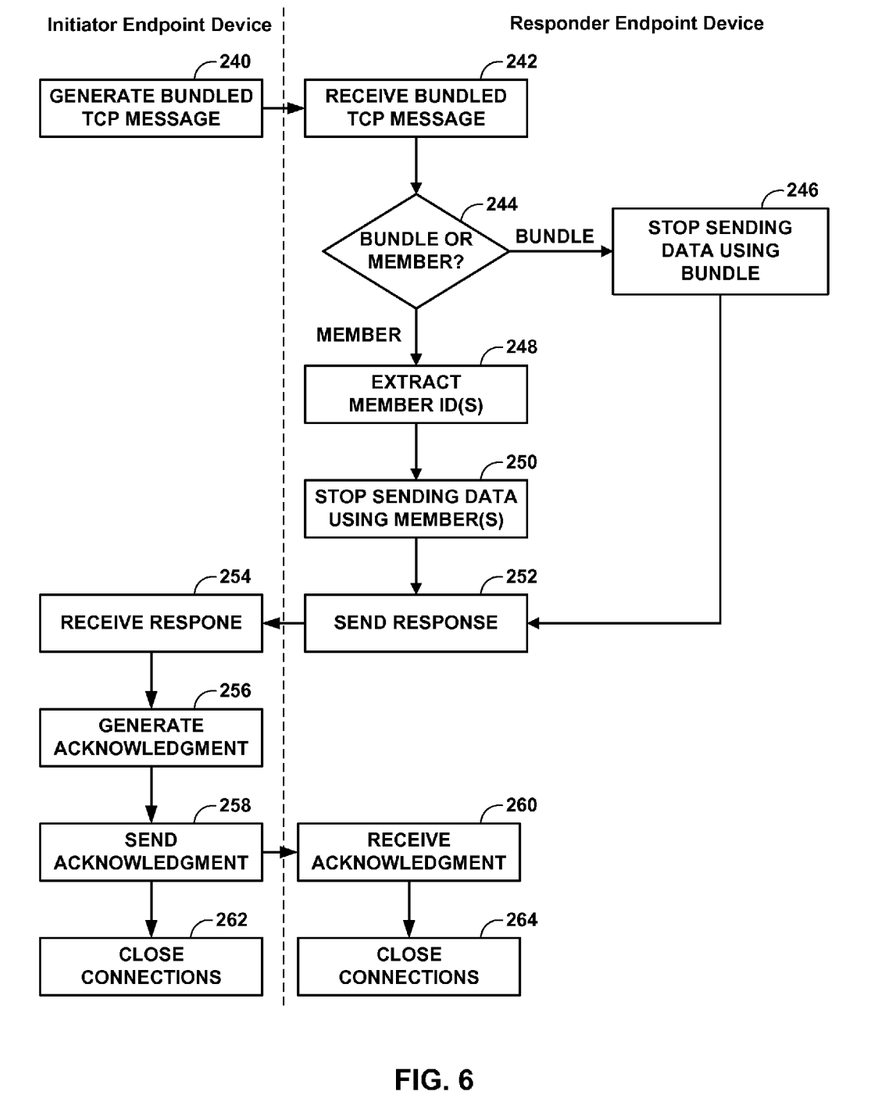
FIG. 6 is a flowchart illustrating an example method for disconnecting one or more TCP connections in a bundled TCP connection and the bundled TCP connection, in accordance with one or more aspects of this disclosure.

FIG. 6 is a flowchart illustrating an example method for disconnecting one or more TCP connections in a bundled TCP connection and the bundled TCP connection, in accordance with one or more aspects of this disclosure. For purposes of illustration only, the example method is described below within the context of network system 2 of FIG. 1 and device 20 of FIG. 2, though various other systems and/or devices may be utilized to implement or perform the method shown in FIG. 6.

In the example illustrated in FIG. 6, device 20 generates a bundled TCP message that includes bundle TCP connection information and/or member TCP connection information that indicates that either the bundled TCP connection or one or more member TCP connections should be closed (240). The bundled TCP message may include other information for other member TCP connections associated with the bundled TCP connection. For example, the bundled TCP message may include an indication to close two member TCP connections, an indication to establish one new member TCP connection, and data for three other member TCP connections.

The responder endpoint receives the bundled TCP message from device 20 and extracts the bundled TCP connection information and the one or more sets of member TCP connection information (242). The responder endpoint analyzes the bundled and member TCP connection information and determines whether the bundled TCP message includes information to close the bundled TCP connection or one or more member TCP connections (244). If the bundled TCP connection is to be closed ("BUNDLE" branch of 244), the responder endpoint stops using the bundled TCP connection and any member TCP connections to send data (246). If one or more member TCP connections are to be closed ("MEMBER" branch of 244), the responder endpoint extracts the responder member endpoint identifiers from each set of member TCP connection information that corresponds to the member TCP connections to be closed (248) and stop sending data using those member TCP connections (250).

The responder endpoint then generates and sends a response message to device 20 (252). The response message includes an acknowledgment for the request to close the bundled TCP connection or an acknowledgment for each member TCP connection identified as to be closed in the bundled TCP message. The response also includes a request to close each of the TCP connections specified in the initial bundled TCP message (e.g., the bundled TCP connection or the one or more member TCP connections). Device 20 receives the response message (254), generates an acknowledgment message (256) to acknowledge the request to close the specified bundled TCP connection or member connections, and sends the acknowledgment message to the responder device (258). Device 20 then closes the specified TCP connections (262). The responder endpoint receives the acknowledgment message (260) and closes the specified TCP connections (264). While device 20 is described as the initiator endpoint with respect to the example method shown in FIG. 6, device 20 may also perform one or more of the techniques described with respect to the responder endpoint.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, other solid state memories, magnetic or optical data storage media, and the like. The techniques additionally, or alternatively, may be realized at least in part by a computer-readable communication medium that carries or communicates code in the form of instructions or data structures and that can be accessed, read, and/or executed by a computer. In some examples, an article of manufacture may comprise one or more computer-readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in a RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

The invention claimed is:

1. A method comprising:
  sending a request from a first network node to a second network node to request a bundled transport control protocol (TCP) connection between the first network node and the second network node, wherein the bundled TCP connection includes a group of member TCP connections associated with the bundled TCP connection;
  receiving a response message with the first network node sent from the second network node, wherein the response message includes an indication of a status of the request;
  sending an acknowledgment message from the first network node to the second network node;
  establishing the bundled TCP connection when the status of the request included in the response message indicates that the request is successful; and
  receiving a control message from the second network node, wherein the control message includes control information for the bundled TCP connection and at least one member TCP connection of the group of member TCP connections.

2. The method of claim 1, further comprising:
  sending first data messages using the bundled TCP connection and at least a first one of the group of member TCP connections and a second one of the group of member TCP connections.

3. The method of claim 2, further comprising:
- receiving a control message from the second network node, wherein the control information comprises an acknowledgment for the first one of the group of member TCP connections; and
- upon receiving the acknowledgment for the first one of the group of member TCP connections from the second network node and prior to receiving an acknowledgement for the second one of the group of member TCP connections, sending second data messages to the second network node using the bundled TCP connection and at least the second one of the group of member TCP connections.

4. The method of claim 1, wherein the request includes a bundled TCP connection endpoint identifier, the method further comprising:
- sending a second request message from the first network node to the second network node to request establishing a new member TCP connection associated with the bundled TCP connection;
- receiving a second response message with the first network node from the second network node; and
- sending a second acknowledgment message from the first network node to the second network node in order to establish the new member TCP connection when the response message includes an indication that the request is successful.

5. The method of claim 1, further comprising:
- determining that there is data to send for two or more member TCP connections in the group of member TCP connections; and
- generating a data packet for the bundled TCP connection that includes the data to send for the two or more member TCP connections.

6. The method of claim 1, further comprising:
- receiving a data packet with the first network node from the second network node using the bundled TCP connection; and
- determining a number of member TCP connection headers included in the data packet.

7. The method of claim 1, when the status of the request indicates that the request was not successful, the method further comprising:
- sending a second request message from the first network node to the second network node to request a non-bundled TCP connection between the first network node and the second network node, wherein the second request message includes an indication of not setting up the bundled TCP connection;
- receiving a second response message with the first network node from the second network node, wherein the second response message includes an indication of a status of the second request; and
- sending a second acknowledgment message with the first network node to the second network node in order to establish the non-bundled TCP connection when the status of the second request indicates that the second request was successful.

8. The method of claim 7, wherein the second request message includes a bundle flag, and wherein the bundle flag is set to a value indicating not to establish a bundled TCP connection.

9. The method of claim 1, wherein the request includes a header, and wherein the header includes a bundle flag, a member flag, an initiator endpoint identifier, and a responder endpoint identifier.

10. The method of claim 9, wherein the bundle flag is set to a predetermined value that indicates whether the header is a bundle header, wherein the bundle header includes control information for the bundled TCP connection, wherein the member flag is set to another predetermined value that indicates whether the header is a member header, and wherein the member header includes control information for a member TCP connection of the group of member TCP connections associated with the bundled TCP connection.

11. The method of claim 9, wherein the indication to set up the bundled TCP connection comprises the bundle flag, wherein the bundle flag is set to a first value if the indication of the status of the request included in the response message is to set up the bundled TCP connection, and wherein the bundle flag is set to a different second value if the indication of the status of the request included in the response message is not to set up a bundled TCP connection.

12. The method of claim 9, wherein the initiator endpoint identifier identifies the first network node, and wherein the responder endpoint identifier identifies the second network node.

13. The method of claim 1, wherein the request is configured in accordance with Internet Protocol version 4 (IPv4), wherein the request includes a protocol field, and wherein the protocol field is set to the indication to set up the bundled TCP connection.

14. The method of claim 1, wherein the request is configured in accordance with Internet Protocol version 6 (IPv6), wherein the request includes a next header field, and wherein the next header field is set to the indication to set up the bundled TCP connection.

15. The method of claim 1, wherein the request includes a bundled TCP connection header for the bundled TCP connection and a member TCP connection header for at least a subgroup of the group of the member TCP connections associated with the bundled TCP connection.

16. The method of claim 1, further comprising:
- sending a disconnect message from the first network node to the second network node, wherein the disconnect message includes an indication for each of the group member TCP connections to disconnect; and
- disconnecting the indicated member TCP connections.

17. The method of claim 1, further comprising:
- sending a disconnect message from the first network node to the second network node, wherein the disconnect message includes a bundled TCP connection identifier corresponding to the bundled TCP connection;
- disconnecting the bundled TCP connection; and
- disconnecting each of the group of member TCP connections upon disconnecting the bundled TCP connection.

18. A non-transitory computer-readable storage medium encoded with instructions for causing one or more programmable processors of a computing system to:
- send a request from the computing system to a second computing system to request a bundled transport control protocol (TCP) connection between the computing system and the second computing system, wherein the bundled TCP connection includes a group of member TCP connections associated with the bundled TCP connection;
- receive a response message sent from the second computing system, wherein the response message includes an indication of a status of the request;
- send an acknowledgment message to the second computing system;

establish the bundled TCP connection when the status of the request included in the response message indicates that the request is successful; and receive a control message from the second computing system, wherein the control message includes control information for the bundled TCP connection and at least one member TCP connection of the group of member TCP connections.

19. A computing system comprising:

one or more programmable processors;

means for sending a request message from the computing system to a second computing system to request a bundled transport control protocol (TCP) connection between the first network node and the second network node, wherein the bundled TCP connection includes a group of member TCP connections associated with the bundled TCP connection;

means for receiving a control message from the second network node, wherein the control message includes control information for the bundled TCP connection and at least one member TCP connection of the group of member TCP connections; and a bundled TCP module executable by the one or more programmable processors to receive a response message from the second computing system, wherein the response message includes an indication of a status of the request, send an acknowledgment message to the second computing system, and establish the bundled TCP connection when the status of the request included in the response message indicates that the request is successful.

* * * * *